United States Patent
Tu et al.

(10) Patent No.: US 8,359,062 B2
(45) Date of Patent: Jan. 22, 2013

(54) NETWORK ACCESS ACROSS WIRELESS TECHNOLOGIES

(75) Inventors: Jerome C. Tu, Saratoga, CA (US); Jianxiong Shi, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 11/618,464

(22) Filed: Dec. 29, 2006

(65) Prior Publication Data
US 2008/0161036 A1 Jul. 3, 2008

(51) Int. Cl.
*H04M 1/00* (2006.01)
(52) U.S. Cl. ............... 455/552.1; 455/432.1; 455/433; 370/328; 370/338
(58) Field of Classification Search .............. 370/338, 370/339, 342, 395.5, 395.51; 455/41.2, 41.3, 455/432.1–433, 435.1, 444, 456.1, 550.1, 455/552.1, 553.1
See application file for complete search history.

(56) References Cited

U.S. PATENT DOCUMENTS

| | | | |
|---|---|---|---|
| 2004/0205158 A1* | 10/2004 | Hsu | 709/218 |
| 2005/0153736 A1* | 7/2005 | Ganton | 455/553.1 |
| 2005/0232209 A1* | 10/2005 | Buckley et al. | 370/338 |
| 2005/0282573 A1* | 12/2005 | Maeno | 455/522 |
| 2006/0187873 A1* | 8/2006 | Friday et al. | 370/328 |
| 2007/0070935 A1* | 3/2007 | Prakash et al. | 370/328 |
| 2007/0080781 A1* | 4/2007 | Ginzburg et al. | 340/7.21 |
| 2007/0211675 A1* | 9/2007 | Jain et al. | 370/338 |
| 2007/0270171 A1* | 11/2007 | Wentink | 455/515 |
| 2008/0008097 A1* | 1/2008 | Avadhanam | 370/235 |

* cited by examiner

*Primary Examiner* — Chuong A Ngo

(57) ABSTRACT

Techniques for accessing wireless networks are disclosed. For instance, an apparatus may include a control module to broadcast messages for transmission within a coverage area of a first type of a wireless communications network. In addition, the apparatus may include a storage medium that stores access parameters for wireless network(s) of a second type that are accessible within the coverage area. Additionally, the control module may generate messages for transmission that include the one or more access parameters. The types of wireless communications networks may be, for example, wireless cellular networks and wireless data communications networks.

5 Claims, 7 Drawing Sheets

NETWORK ACCESS ACROSS WIRELESS TECHNOLOGIES

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Certain devices may include multiple radios to access different wireless networks. Currently, such devices may passively collect network access information when powering up or during idle modes. Such devices then attempt to register to networks sequentially without prior knowledge of preferences imposed by a network operator. Techniques for providing devices with information for network access across different technologies may be desired.

DETAILED DESCRIPTION

Various embodiments may be generally directed to techniques for accessing wireless networks. For instance, an apparatus may include a control module to broadcast messages for transmission within a cell of a wireless cellular communications network. In addition, the apparatus may include a storage medium that stores access parameters for wireless data networks that are accessible within the cell. Additionally, the control module may generate messages for transmission that include the one or more access parameters.

Alternatively, an apparatus may include a control module to broadcast messages for transmission within a coverage area of a wireless data communications network. In addition, the apparatus may include a storage medium that stores access parameters for wireless cellular networks that are accessible within the cell. Additionally, the control module may generate messages for transmission that include the one or more access parameters.

Thus, embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
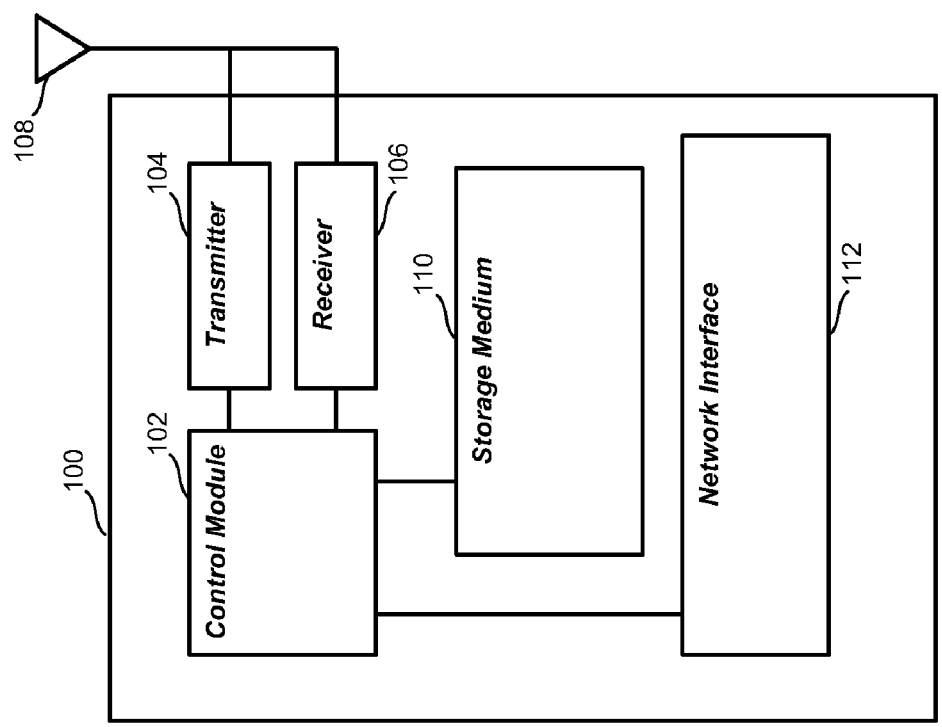
FIG. 1 illustrates an embodiment of an apparatus.

FIG. 1 illustrates one embodiment of an apparatus that may provide wireless communications. In particular, FIG. 1 illustrates an apparatus 100 comprising various elements. For instance, FIG. 1 shows that apparatus 100 may include a control module 102, a transmitter 104, a receiver 106, an antenna 108, a storage medium 110, and a network interface 112. These elements may be implemented in hardware, software, firmware, or any combination thereof. The embodiments, however, are not limited to these depicted elements.

Apparatus 100 may provide for communications within a corresponding coverage area. Accordingly, apparatus 100 may be included in a cellular base station. This cell may be part of a cellular communications network having multiple cells. Alternatively, apparatus 100 may be associated with other types of wireless networks. For instance, apparatus 100 provides for wireless communications in accordance with various wireless data networks.

Transmitter 104 and receiver 106 may include components to provide for the transmission and reception (through antenna 108) of signals at various frequencies and according to various modulation schemes. Accordingly, transmitter 104 and receiver 106 may include modulators, demodulators, amplifiers, filters, and so forth. Such components may be implemented in hardware, software, firmware or any combination thereof.

Thus, through transmitter 104 and antenna 108, control module 102 may send information to wireless devices. Conversely, control module 102 may receive information from wireless devices through receiver 106 and antenna 108. Such information may be in accordance with one or more cellular systems. Alternatively, such information may be in accordance with one or more data networking systems.

In addition to providing wireless communications of a certain type, apparatus 100 may provide devices with access information or parameters for different type(s) of wireless communication. Examples of such features are provided below with reference to FIGS. 2 and 3.

Figure 2:
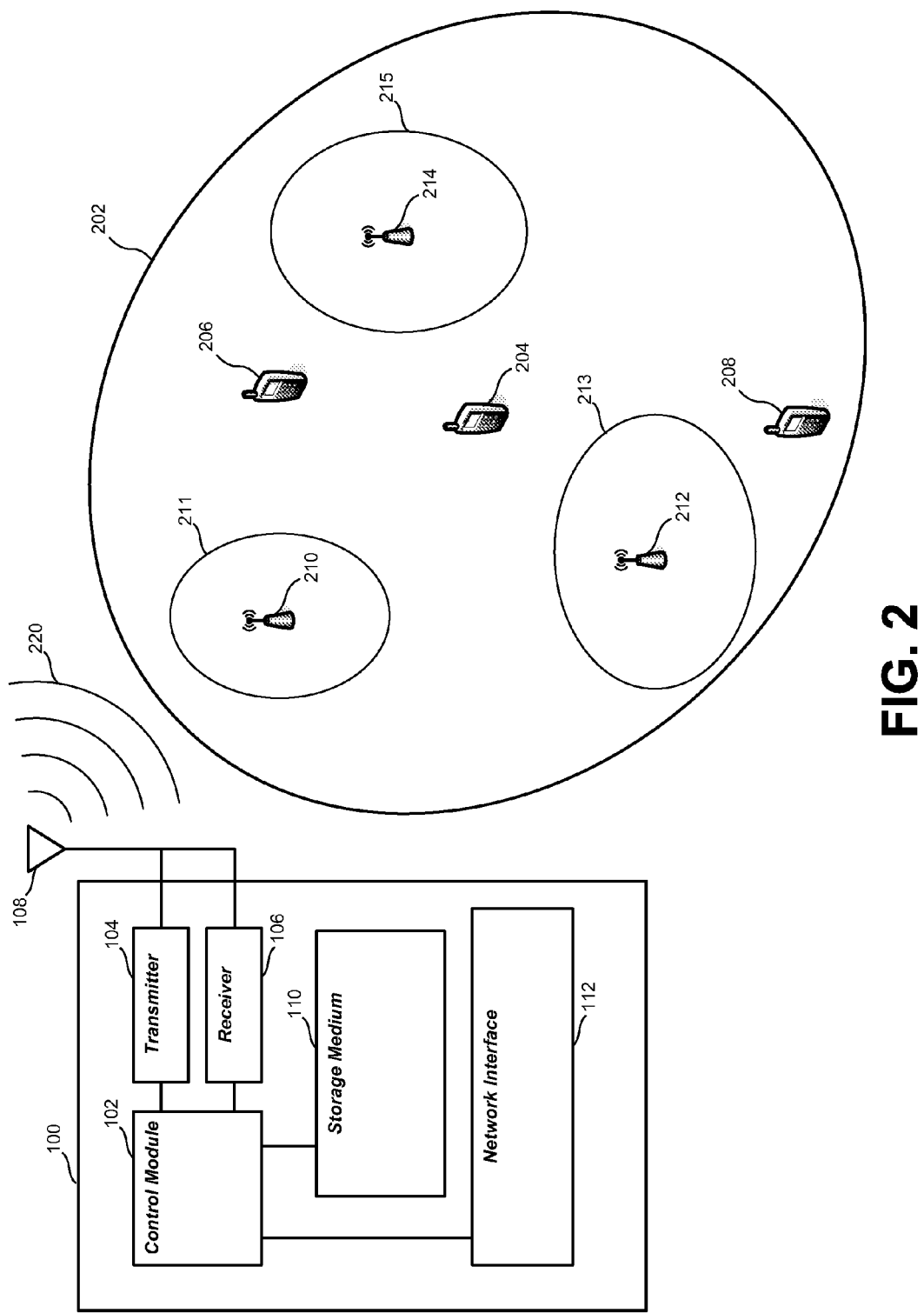
FIGS. 2 and 3 illustrate exemplary implementation embodiments.

FIG. 2 illustrates an exemplary implementation environment in which apparatus 100 provides cellular communications. In particular, FIG. 2 shows apparatus 100 providing a cell having a corresponding coverage area 202. Accordingly, apparatus 100 may be included in a cellular base station. This cell may be part of a cellular communications network having multiple cells. Within coverage area 202, wireless devices may engage in cellular communications via apparatus 100. For instance, FIG. 2 shows apparatus 100 communicating with wireless devices 204, 206, and 208. Such wireless devices may include mobile telephones, wireless personal digital assistants (PDAs), notebook computers, and so forth.

Exemplary cellular systems include Code Division Multiple Access (CDMA) systems, Global System for Mobile Communications (GSM) systems, North American Digital Cellular (NADC) systems, Time Division Multiple Access (TDMA) systems, Extented-TDMA (E-TDMA) systems, Digital Advanced Mobile Phone Service (IS-136/TDMA)

systems, Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples.

Further wireless networks may be within coverage area 202. These networks may be provided by devices, such as access points. For instance, FIG. 2 shows access points 210, 212, and 214. These access points may provide for communications with devices across wireless data networking links. Examples of such data networking links include wireless local area network (WLAN) links, such as IEEE 802.11 WiFi links. Further examples include wireless metropolitan area (WMAN) links, such as IEEE 802.16 WiMax links and WiBro links. Yet further examples include WiMedia/Ultra Wide Band (UWB) links (such as ones in accordance with Ecma International standards ECMA-368 and ECMA-369). Also, exemplary data networking links include personal area networks (PAN) links such as Bluetooth links, and WiBree (initially developed by Nokia Research Centre) links. The embodiments, however, are not limited to these examples.

FIG. 2 shows that each of access points 210, 212, and 214 has a corresponding coverage area. For instance, access point 210 has a coverage area 211, access point 212 has a coverage area 213, and access point 214 has a coverage area 215. These coverage areas may be WiFi hotspots, and/or other forms of wireless network access zones.

As shown in FIG. 2, control module 102 (e.g., through transmitter 104 and antenna 108) may wirelessly transmit information 220 to wireless devices within coverage area 202. Such information may be in the form of system information messages. For example, control module 102 may broadcast to all wireless devices within coverage area 202 a list of neighboring cells (which may be identified, for example, by cellular frequencies) for the wireless devices to monitor. These frequencies may belong to neighboring cellular base stations. In certain cases, these frequencies may be the only ones that the receiving wireless devices are allowed to use (or handover into).

In addition, such information may relate to different cellular technologies. For instance, in cellular networks that employ a mix of technologies (e.g., GSM and UMTS), control module 102 may broadcast network access information regarding a different cellular technology that is permissible for wireless devices to monitor and use. For example, in the case where apparatus 100 provides GSM communications for the cell, control module 102 may broadcast access parameters for neighboring UMTS base stations that are allowed (e.g., that are within the same network).

Through such mechanisms, a cellular operator may ensure that wireless devices only operate with base stations in its network. Moreover, such mechanisms may ensure that a wireless device does not inadvertently register with competing cellular networks.

Embodiments provide techniques that transcend cellular technologies. For example, control module 102 may broadcast system information messages that include parameters relevant to other types of networks. Such parameters may provide for access to these other types of networks. For instance, control module 102 may broadcast (through transmitter 104 and antenna 108) parameters for accessing networks provided by one or more of access points 210, 212, and 214.

Thus, apparatus 100 may "push" these access parameters to wireless devices over the air via broadcast control channels. Broadcast control channels are used by cellular base stations to deliver various messages (containing, for example, contain signaling and overhead information) to wireless devices. Examples of such control channels include paging channels. In GSM systems, exemplary control channels include broadcast control channels (BCCH), slow associated control channels (SACCH), fast associated control channels (FACCH). However, the embodiments are not limited to these examples.

For instance, using WiFi access points for purposes of illustration (and not limitation) control module 102 may broadcast parameters relevant for WiFi access to access points 210, 212, and/or 214. Such information may include WiFi access point network names, service set identifiers (SSIDs), access channels, and/or other identifying information.

Through such techniques, wireless devices (e.g., devices 204, 206, and/or 208) participating in a cellular network of apparatus 100 may learn about other types of wireless networks (e.g. access point(s) provided WiFi networks, etc.). These other (e.g., non-cellular) networks may be ones that the cellular network operator prefers. This allows the operator much better control over terminal's non-cellular network usage. As a result, cellular network operators may advantageously receive benefits (e.g., fees, advertising revenue, etc.) for such "network referral" techniques.

Moreover, such techniques provide advantages to wireless devices. For instance, user devices may not need to track and manage multiple networking profiles (e.g., non-cellular networking profiles), since they are updated and received over the air.

Figure 3:
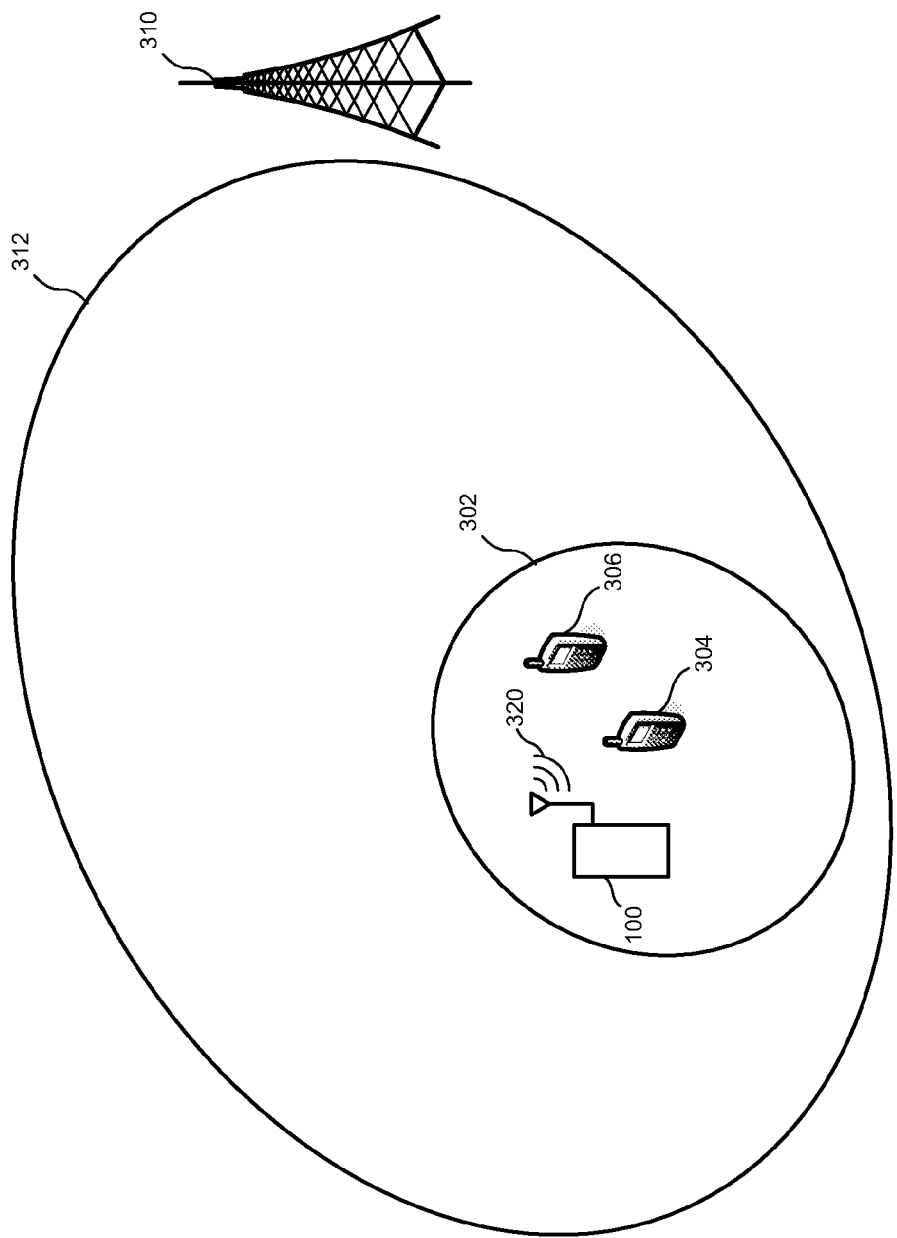

FIG. 3 illustrates a further exemplary implementation environment in which apparatus 100 provides wireless data networking communications. For instance, FIG. 3 shows apparatus 100 providing communications within a corresponding coverage area 302. Accordingly, in this implementation, apparatus 100 may be included in an access point. Thus, coverage area 302 may be a WiFi hotspot, or another form of wireless network access zone.

Within coverage area 302, apparatus 100 may engage in data communications with one or more devices. Such data communications may employ one or more of the data networking link types described above. In particular, FIG. 3 shows apparatus 100 communicating with wireless devices 304 and 306. Such wireless devices may include wireless personal digital assistants (PDAs), smart phones, notebook computers, and so forth. These communications may involve apparatus 100 wirelessly sending information 320.

FIG. 3 further shows that apparatus 100, device 304 and device 306 are within a coverage area 312. As shown in FIG. 3, this coverage area corresponds to a cell provided by a cellular base station 310. Cellular base station 310 may operate in accordance with one or more of the cellular systems described above.

In embodiments, apparatus 100 may transmit parameters to devices 304 and 306 that allow these devices to access the cellular network associated with base station 310. For instance, apparatus 100 may transmit information such as cell identifiers, network identifiers, and/or frequency identifiers. However, the embodiments are not limited to such examples.

Such information may be transmitted in various ways. One way involves the transmission of control messages. For example, apparatus 100 may transmit cellular access parameters in periodic beacon transmissions. For IEEE 802.11 WiFi networks, such beacon transmissions are sent approximately once every 100 milliseconds. The embodiments, however, are not limited to IEEE 802.11 networking and/or beacon transmissions. For instance, other transmission techniques may be employed to distribute cellular access parameters.

Accordingly, embodiments may further allow for wireless devices (e.g., devices 304 and/or 306) to learn about cellular networks while participating in wireless data networks. This allows the data network operators much better control over a device's cellular network usage. As a result, data network operators may advantageously receive benefits (e.g., fees, advertising revenue, etc.) for such "network referral" techniques. Moreover, such techniques may provide assistance to devices in finding accessible cellular networks.

Referring again to FIG. 1, apparatus 100 includes storage medium 110, which may be implemented with memory or other media suitable for storing information. Various forms of information may be stored by storage medium 110. For instance, storage medium 110 may contain parameters for accessing various wireless networks, as described herein. Such information may be in the form of a preferred network list.

The preferred network list may, for example, indicate one or more preferred non-cellular (e.g., WiFi) networks along with associated parameter(s) to allow for their access. Alternatively, the preferred network list may indicate one or more preferred cellular networks and the associated access parameter(s).

Also, apparatus 100 includes network interface 112, which provides for communications with other entities associated within the cellular network. Such entities may include other base stations, network operator control entities, terrestrial telephony networks, and/or data networks. Accordingly, network interface 112 may include various components, such as network interface cards, line cards, transceiver, and so forth. As stated above, such components may be implemented in hardware, software, firmware, or any combination thereof.

During operation of apparatus 100, a network operator may (through communications interface 112) update preferred network information and cause these updates (e.g., through control module 102) to be stored in storage medium 110.

Figure 4:
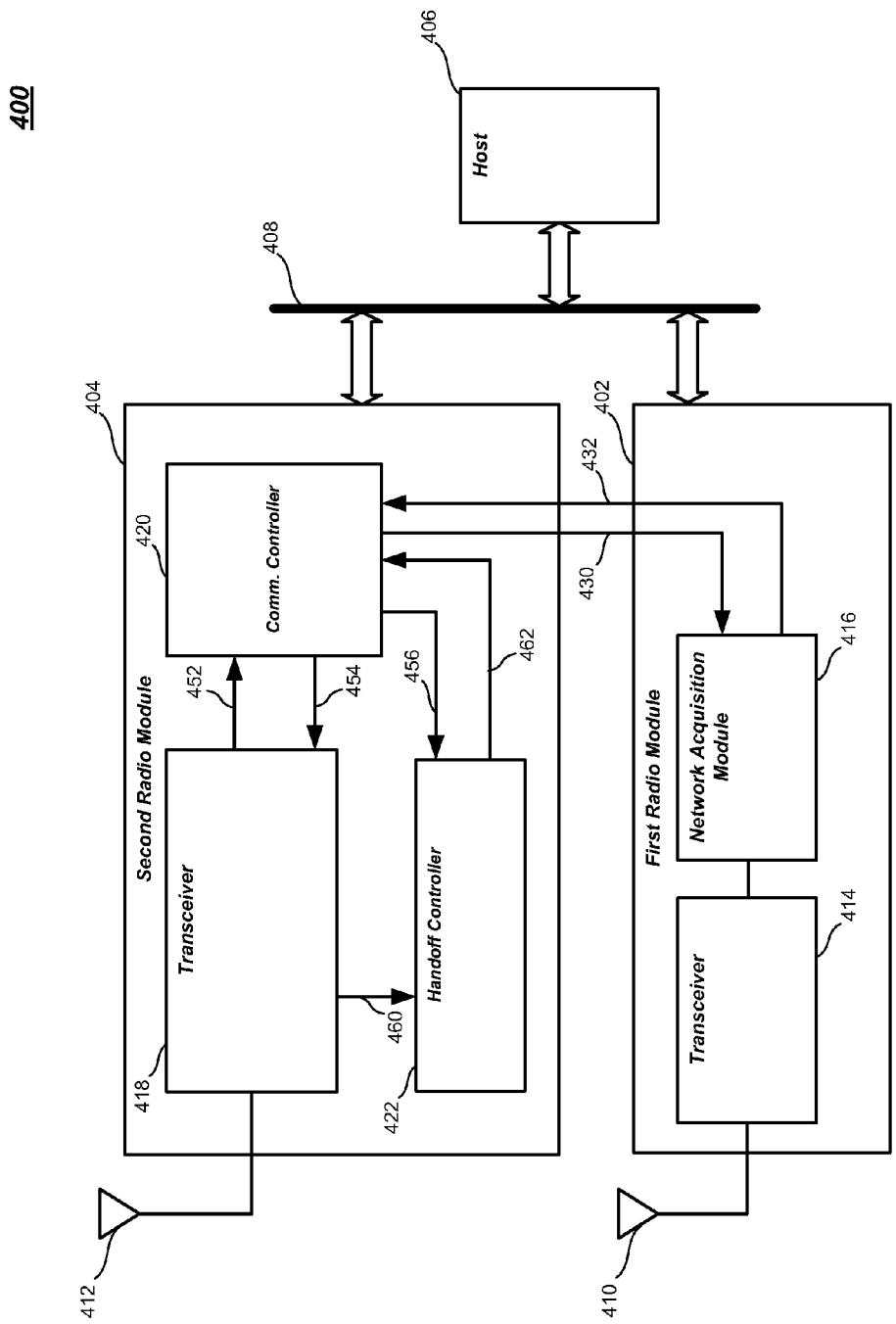
FIG. 4 illustrates a further embodiment of an apparatus.

As described above, apparatus 100 may communicate with various wireless devices in accordance with cellular networking techniques. These devices, in turn, may be capable of communicating across different types of wireless links. Accordingly, FIG. 4 illustrates an apparatus 400 that may communicate across different types of wireless links. With reference to FIG. 2, apparatus 400 may be included in wireless devices 204, 206, and/or 208. Further, with reference to FIG. 3, apparatus may be included in wireless devices 304 and 306. However, apparatus 400 is not limited to these contexts.

In particular, FIG. 4 shows apparatus 400 comprising various elements. The embodiments, however, are not limited to these depicted elements. In particular, FIG. 4 shows that apparatus 400 may include a first radio module 402, a second radio module 404, a host 406, and an interconnection medium 408. These elements may be implemented in hardware, software, firmware, or in any combination thereof.

First radio module 402 and second radio module 404 may communicate with remote devices across different types of wireless links. For example, first radio module 402 may communicate across data networking links such as the one or more of the links described above with reference to FIG. 1. Second radio module 404 may communicate across wireless links provided by one or more cellular systems. Examples of cellular systems are described above with reference to FIG. 1. Although FIG. 4 shows radio modules 402 and 404 each employing separate antennas 410 and 412, these radio modules may alternatively share an antenna.

FIG. 4 shows that first radio module 402 may comprise a transceiver 414 and a network acquisition module 416. Transceiver 414 may (through antenna 410) exchange wireless signals across one or more wireless links. As described above, these links may include one or more data networking links. However, the embodiments are not limited to such.

Network acquisition module 416 may (through transceiver 414) seek and/or acquire wireless networks. Such networks may be data networking or non-cellular networks. More particularly, such network acquisitions may involve first radio module 402 establishing links with remote devices, such as one or more access points. The seeking and/or acquisition of such links may be in accordance with network parameter(s) 430 provided by second radio module 404.

For instance, network acquisition module 416 may (through transceiver 414) use network parameter(s) 430 to initiate scanning operations. Such initiated scanning operations may be active (instead of passive). More particularly, through active scanning, transceiver 414 transmits "probe" messages instead of "passively" listening for network-identifying transmissions. Such probe messages solicit responses identifying networks within communicating range. If a response is received that matches network parameters 430, then radio module 402 may acquire the network. Additionally or alternatively, passive scanning operations may be employed.

Further, network acquisition module 416 may assist second radio module 404 in seeking and/or acquiring networks. Such networks may be of a different type or technology than links handled by first radio module 402. More particularly, network acquisition module 416 may receive (through transceiver 414) parameters for accessing wireless network(s) of other types (e.g., cellular networks).

Accordingly, first radio module 402 may send network parameter(s) 432 to second radio module 404. More particularly, FIG. 4 shows that network parameter(s) 432 may be sent from network acquisition module 416 to a communications controller 420 of second radio module 404.

Network parameter(s) 432 may be received (via transceiver 414) from a remote device. For instance, network parameter (s) 432 may be received from a device (such as an access point) over a data networking link. As described above, parameter(s) 432 may be conveyed in beacon transmissions associated with networks, such as IEEE 802.11 WiFi networks. The embodiments, however, are not limited to this context.

Upon demodulation and/or decoding of such transmissions, transceiver 414 passes the received parameter(s) to network acquisition module 416. In turn, network acquisition module 416 may forward this information to communications controller 420 as network parameter(s) 432.

FIG. 4 further shows that second radio module 404 may include a transceiver 418, communications controller 420, and a handoff controller 422. Transceiver 418, in conjunction with antenna 412, exchanges wireless signals across one or more wireless links. As described above, these links may include (but are not limited to) one or more cellular links.

Communications controller 420 exchanges information with transceiver 418. For instance, FIG. 4 shows communications controller 420 receiving demodulated information 452 from transceiver 418, and sending baseband information 454 to transceiver 418. Both demodulated information 452 and baseband information 454 correspond to wireless signals exchanged by transceiver 418. This information may include payload information as well as additional overhead information. For example, demodulated information 452 may include identifiers of neighbor cells within communications range. As described above, such identifiers may be provided by base stations, for example, as frequency indicators.

In addition, demodulated information 452 may include information or parameters regarding other (e.g., non-cellular) networks. For instance, demodulated information may include network access parameters transmitted by a base station in its broadcast control channels. As described above, such information or parameters may include access point network names, service set identifiers (SSIDs), access channels, and/or other identifying information. As shown in FIG. 4, communications controller 420 forwards such information to first radio module 402 as network parameter(s) 430.

With respect to the transmission and reception of information via transceiver 418, communications controller 420 may be responsible for operations associated with one or more protocol layers. Such operations may include error correction encoding and decoding, packet encapsulation, timing control (e.g., synchronization with transmission frames and/or pseudo noise (PN) sequences), as well as others. However, the embodiments are not limited to such examples.

In addition, FIG. 4 shows communications controller 420 receiving network parameter(s) 432 from network acquisition module 416 of first radio module 402.

Handoff controller 422 performs handoff operations. These operations may involve monitoring and evaluating candidates (e.g., neighbor cells) for potential handoffs. The candidates may be evaluated based on candidate neighbor data 460 (e.g., signal strength information). As shown in FIG. 4, neighbor data 460 may be received from transceiver 418. Also, the candidates may be identified in a neighbor list 456 received from communications controller 420.

Neighbor list 456 indicates neighbors or particular remote devices (e.g., neighbor cells) for evaluation by handoff controller 422. The identity of these neighbors may be provided by a base station communicating with second radio module 404. Additionally or alternatively, the identity of these neighbors may be provided by first radio module 402 through network access parameter(s) 432. As described above, such parameter(s) originate from wireless communications across a different link type (e.g., a non-cellular) link.

As a result of such evaluations, handoff controller 422 may make a handoff decision, which is sent to communications controller 420 as decision indicator 462. In turn, communications controller 420 may (in conjunction with transceiver 418) initiate handoff operations in accordance with the connected cellular system procedures.

Host 406 may exchange information with radio modules 402 and 404. As shown in FIG. 4, such exchanges may occur across interconnection medium 408. For instance, host 406 may send information to these radio modules for wireless transmission. Conversely, radio modules 402 and 404 may send information to host 406 that was received in wireless transmissions. In addition, host 406 may exchange information with radio modules 402 and 404 regarding their configuration and operation. Examples of such information include control directives sent from host 406 to radio modules 402 and 404.

Furthermore, host 406 may perform operations associated with higher layer protocols and applications. For instance, host 406 may provide various user applications, such as telephony, text messaging, e-mail, web browsing, word processing, video signal display, and so forth. In addition, host 406 may provide one or more functional utilities that are available to various protocols, operations, and/or applications. Examples of such utilities include operating systems, device drivers, user interface functionality, and so forth.

Although FIG. 4 illustrates host 406, embodiments may not include a separate host. Also, embodiments may provide an integrated host/radio architecture. In such embodiments, features of a host and one or more radio modules may be implemented together in a single entity, such as a processor or package. Accordingly, a single processor (or processing entity) may provide host and radio module(s). Thus, interconnection medium 408 may include non-physical aspects. More particularly, such interconnectivity may be implemented through messages passed between processes or software modules.

Interconnection medium 408 provides for couplings among elements, such as first radio module 402, second radio module 404, and host 406. Thus, interconnection medium 408 may include, for example, one or more bus interfaces. Examples of such interfaces include Universal Serial Bus (USB) interfaces, as well as various computer system bus interfaces. Additionally or alternatively, interconnection medium 408 may include one or more point-to-point connections (e.g., parallel interfaces, serial interfaces, etc.) between various element pairings.

FIG. 4 shows information being exchanged among the elements of apparatus 400. For example, FIG. 4 shows network parameter(s) 430 being sent from communications controller 420 of second radio module 404 to network acquisition module of first radio module 402. FIG. 4 shows network parameter(s) 430 being sent between these entities directly. However, the embodiments are not so limited. For instance, such information may be routed through one or more intermediate elements. Examples of such elements may include (but are not limited to) interconnection medium 408 and/or host 406.

As described above, the elements of FIGS. 1 and 4 may be implemented in hardware, software, firmware, or in any combination therefore. For example, many features of these elements may be implemented through instructions or logic executed by one or more processors. Accordingly, such processor(s) may be allocated among various elements. The instructions or logic may be stored in various types of storage media, such as memory.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 5:
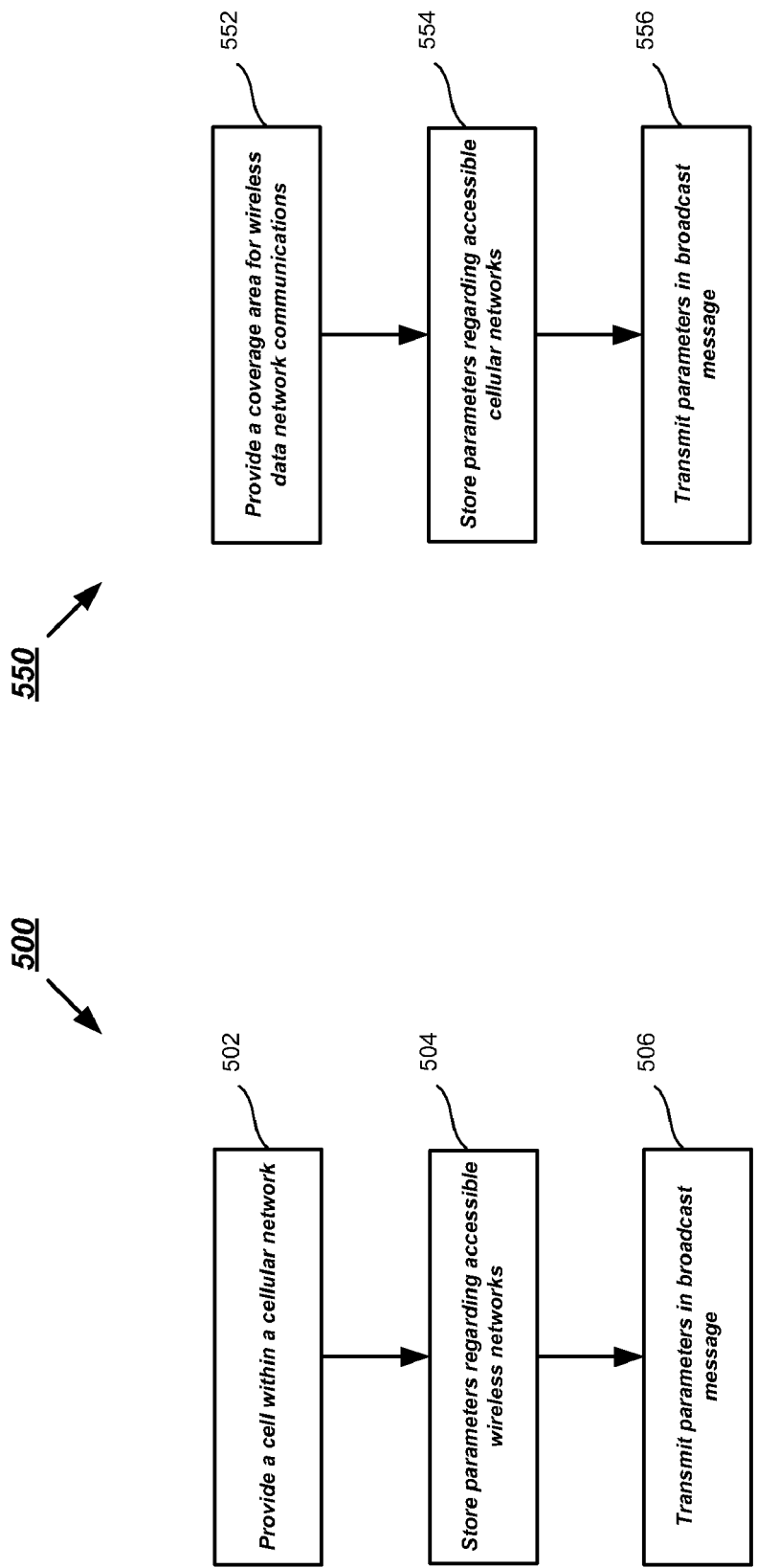
FIGS. 5A and 5B illustrate embodiments of logic flows.

FIGS. 5A and 5B illustrate embodiments of logic flows. These flows may be representative of operations executed by one or more embodiments described herein. For instance, these flows may performed by apparatus 100, as well as by other embodiments.

In particular, FIG. 5A illustrates a logic flow 500, As shown in logic flow 500, a block 502 provides a cell within a wireless cellular communications network. This cell has a coverage area, within which one or more wireless data (e.g., non-cellular) networks may be accessible. As described above, these one or more wireless data networks may be preferred by the operator or provider of the cellular communications network.

A block 504 stores parameters regarding the accessible wireless data network(s). These parameters may be transmitted by a block 506. This transmission may be in a system information message, such as a message in a cellular broadcast control channel.

FIG. 5B illustrates a logic flow 550, which includes a block 552. Block 552 provides a coverage area for wireless data network communications. Within this coverage area, one or more wireless cellular networks may be accessible. As described above, these one or more wireless networks may be preferred by the operator or provider of the wireless data network communications.

A block 554 stores parameters regarding the accessible cellular network(s). These parameters may be transmitted by a block 556. This transmission may be in a protocol transmission, such as a beacon transmission.

Figure 6:
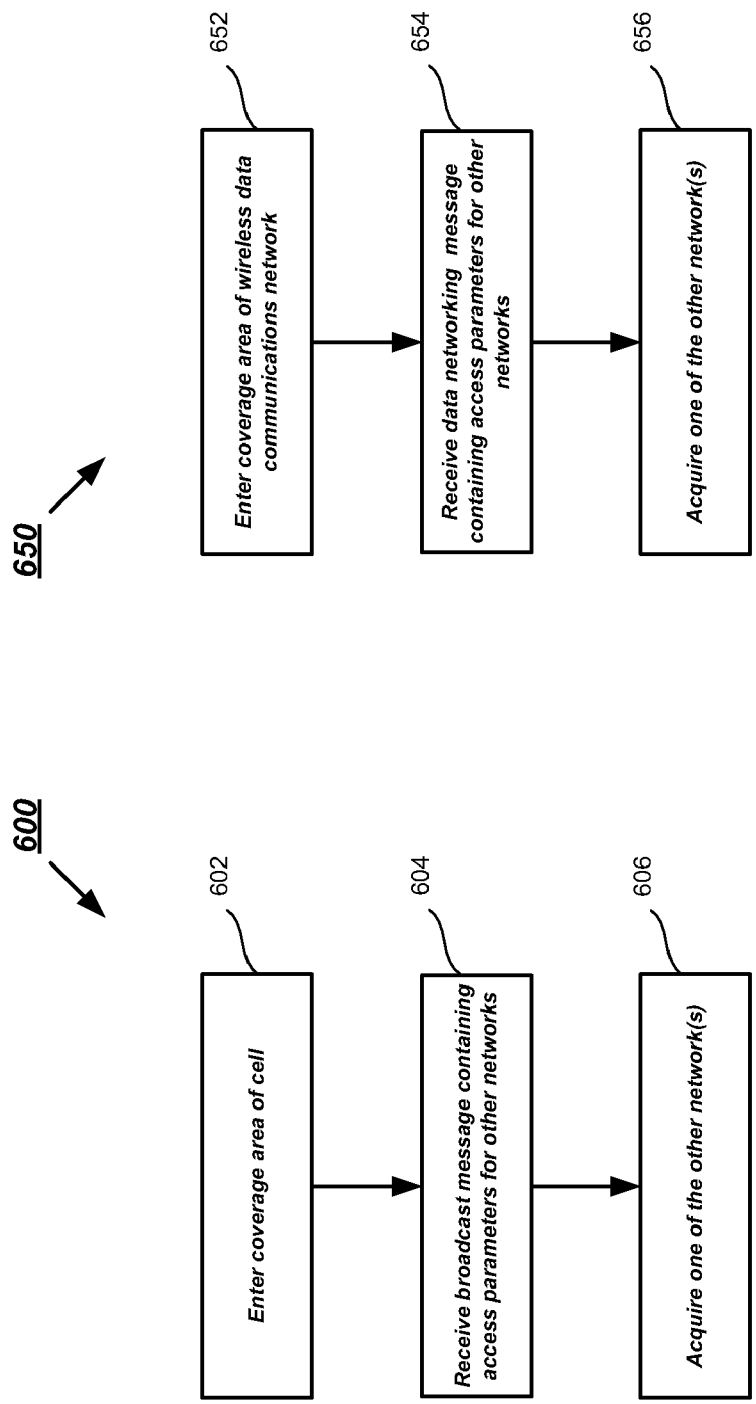
FIGS. 6A and 6B illustrate further embodiments of logic flows.

FIGS. 6A and 6B illustrate further embodiments of logic flows. These flows may be representative of operations executed by one or more embodiments described herein. For instance, these flows may be performed by apparatus 400, as well as by other embodiments.

In particular, FIG. 6A illustrates a logic flow 600, which includes a block 602. Block 602 enters a coverage area of cell within a wireless cellular communications network. A block 604 receives a system information message from a base station of the cellular network. This system information message includes one or more parameters regarding wireless data network(s) accessible within the coverage area. In the context of FIG. 4, this may involve second radio module 404 receiving a message from a broadcast control channel, and first radio module 402 receiving parameter(s) 430.

Based on these parameter(s), a block 606 acquires one of the wireless data network(s). As described above with reference to FIG. 4, this may involve first radio module 402 engaging in scanning activities.

FIG. 6B illustrates a logic flow 650, which includes a block 652. Block 652 enters a coverage area of a wireless data communications network. This coverage area may be, for example, a WiFi hotspot or other data networking access zone. A block 654 receives a message from a device (e.g., an access point) associated with the data communications network. This system message includes one or more parameters regarding cellular network(s) accessible within the coverage area. In the context of FIG. 4, this may involve first radio module 402 receiving a message such as a beacon transmission, and second radio module 404 receiving parameter(s) 432.

Based on these parameter(s), a block 656 acquires one of the cellular communications network(s). As described above with reference to FIG. 4, this may involve second radio module 404 engaging in various handoff operations.

Figure 7:
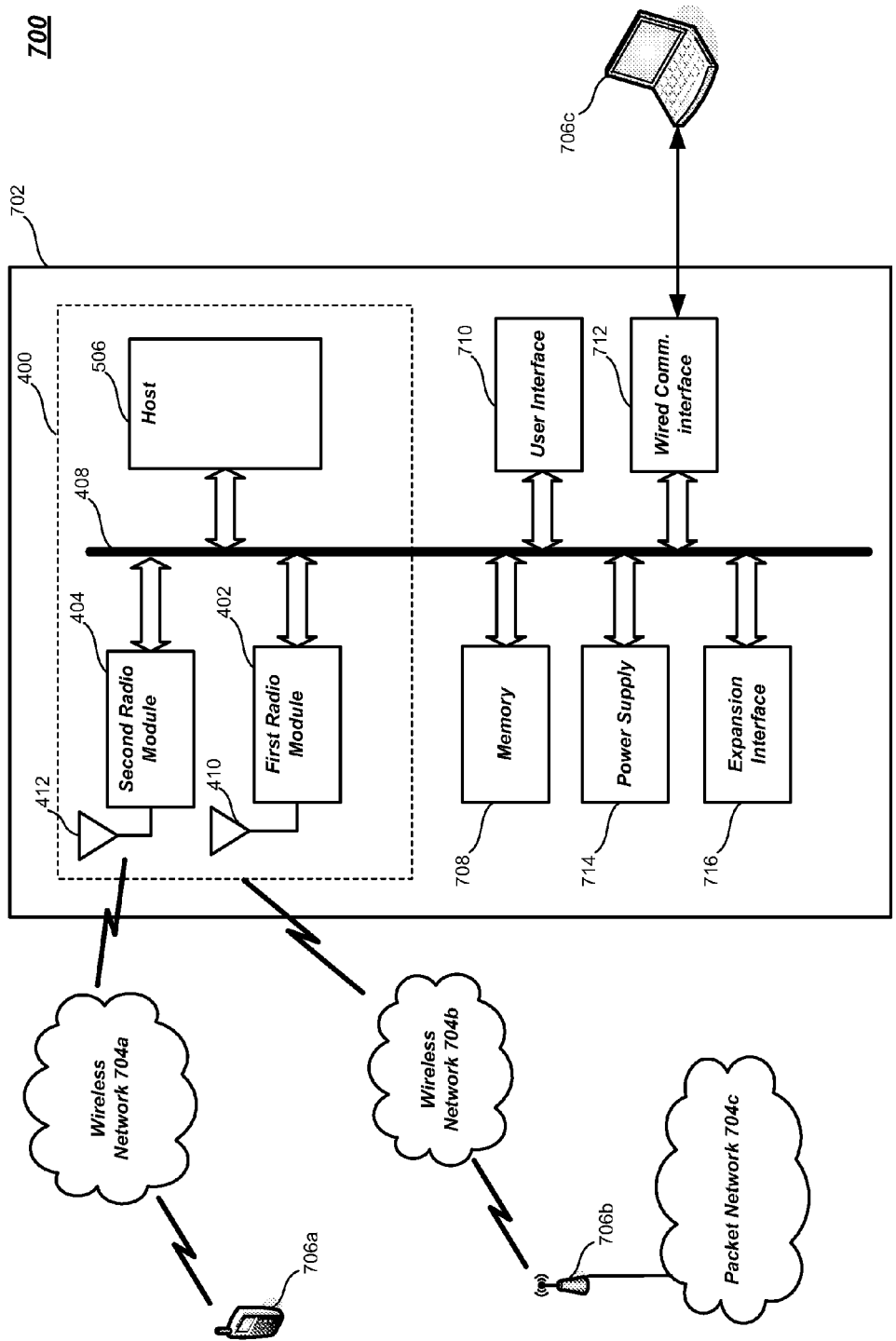
FIG. 7 is a diagram of an exemplary system.

FIG. 7 illustrates an embodiment of a system 700. This system may be suitable for use with one or more embodiments described herein, such as apparatus 400, logic flows 600 and 650, and so forth. Accordingly, system 700 may engage in wireless communications across various link types, such as the ones described herein. In addition, system 700 may perform various user applications.

As shown in FIG. 7, system 700 may include a device 702, multiple communications networks 704, and one or more remote devices 706. FIG. 7 shows that device 702 may include the elements of FIG. 4. However, device 702 may alternatively include elements of other embodiments. As described above, such other embodiments may involve integrated host/radio architectures.

Also, device 702 may include a memory 708, a user interface 710, a wired communications interface 712, a power supply (e.g., a battery) 714, and an expansion interface 716. These elements may be implemented in hardware, software, firmware, or any combination thereof.

Memory 708 may store information in the form of data. For instance, memory 708 may contain application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements. Exemplary elements include host 406, one or more components within radio modules 402 and 404, user interface 710, and/or communications interface 712.

It is worthy to note that some portion or all of memory 708 may be included in other elements of system 700. For instance, some or all of memory 708 may be included on a same integrated circuit or chip with elements of apparatus 400. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keyboard (e.g., a full QWERTY keyboard), a keypad, a touch screen, a microphone, and/or an audio speaker.

Wired communications interface 712 provides for the exchange of information with a device 706c (e.g., a proximate device), such as a personal computer. This exchange of information may be across one or more wired connections. Examples of such connections include USB interfaces, parallel interfaces, and/or serial interfaces. In addition, interface 712 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

Power supply 714 provides operational power to elements of device 702. Accordingly, power supply 714 may include a battery. Such a battery may be rechargeable and/or removable. Alternatively or additionally, power supply 714 may include an interface to an external power source, such as an alternating current (AC) source. However, the embodiments are not limited to these examples.

FIG. 7 shows that device 702 may communicate across wireless networks 704a and 704b. In particular, FIG. 7 shows communications across network 704a being handled by second radio module 404, and communications across network 704b being handled by first radio module 402. First wireless network 704a may be a cellular network, while second wireless network 704b may be a wireless data network. However, the embodiments are not limited to these examples.

Such wireless communications allow device 702 to communicate with various remote devices. For instance, FIG. 7 shows device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide device 702 with access to further communications resources. For example, FIG. 7 shows access point 706b providing access to a packet network 704c, such as the Internet.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various storage media or memory, have been described herein. Memory may be implemented using any machine-readable or computer-readable media capable of storing data, including both volatile and non-volatile memory. For example, memory 608 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
   scanning a coverage area of a cell included within a wireless cellular communications network for one or more wireless data networks, the scanning using one or more probe messages that solicit a response identifying one or more wireless data networks that are accessible within the coverage area and preferred by a network operator;
   storing multiple access parameters for the one or more identified wireless data networks in a networks list, the multiple access parameters including a network name, a service set identifier (SSID), and an access channel;
   storing signal strength information for one or more neighboring wireless data networks; and transmitting over a broadcast control channel of the cellular communica- tions network a cellular system information message, the cellular system information message including the one or more multiple access parameters and the signal strength information for the one or more neighboring wireless data networks.

2. The method of claim 1, wherein at least one of the wireless data networks is an IEEE 802.11 network and/or an IEEE 802.16 network.

3. The method of claim 1, further comprising:
receiving the multiple access parameters from an operator of the wireless cellular communications network.

4. An apparatus, comprising:
a control module operative to generate probe messages for transmission within a cell of a wireless cellular communications network, the probe messages to solicit a response identifying one or more wireless data networks that are accessible within a coverage area and preferred by a network operator; and
a storage medium operative to store multiple access parameters for the one or more identified wireless data networks that are accessible within the coverage area in a networks list, the storage medium to store signal strength information for one or more neighboring wireless data networks;
wherein the multiple access parameters include a network name, a service set identifier (SSID), and an access channel, and
wherein the control module is to generate for transmission, over a broadcast control channel of the cellular communications network, a cellular system information message including the multiple access parameters and the signal strength information for the one or more neighboring wireless data networks.

5. An apparatus, comprising:
a first radio module operative to receive a message from a cellular base station over a broadcast control channel of a cellular communications network, the message including multiple access parameters for one or more wireless data networks that are accessible within a coverage area of the cellular base station and preferred by a network operator and signal strength information for one or more neighboring wireless data networks, the first radio module to send the multiple access parameters to a second radio module, the one or more multiple access parameters to enable the second radio module to acquire one of the one or more wireless data networks;
wherein the multiple access parameters include a network name, a service set identifier, and an access channel.

* * * * *

UNITED STATES PATENT AND TRADEMARK OFFICE
CERTIFICATE OF CORRECTION

PATENT NO. : 8,359,062 B2
APPLICATION NO. : 11/618464
DATED : January 22, 2013
INVENTOR(S) : Jerome C. Tu et al.

Page 1 of 1

It is certified that error appears in the above-identified patent and that said Letters Patent is hereby corrected as shown below:

In the Claims:

In column 13, line 3, in Claim 1, before "multiple" delete "one or more".

In column 14, line 20, in Claim 5, before "multiple" delete "one or more".

Signed and Sealed this
Twenty-third Day of April, 2013

Teresa Stanek Rea
*Acting Director of the United States Patent and Trademark Office*